United States Patent
Park et al.

(10) Patent No.: US 8,472,872 B2
(45) Date of Patent: *Jun. 25, 2013

(54) ON-CHANNEL REPEATING APPARATUS AND METHOD

(75) Inventors: Sung Ik Park, Daejeon (KR); Heung Mook Kim, Daejeon (KR); Jong-Soo Lim, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 798 days.

This patent is subject to a terminal disclaimer.

(21) Appl. No.: 12/674,418

(22) PCT Filed: Aug. 20, 2008

(86) PCT No.: PCT/KR2008/004847
§ 371 (c)(1),
(2), (4) Date: Feb. 19, 2010

(87) PCT Pub. No.: WO2009/025496
PCT Pub. Date: Feb. 26, 2009

(65) Prior Publication Data
US 2011/0111694 A1  May 12, 2011

(30) Foreign Application Priority Data

Aug. 21, 2007 (KR) .................. 10-2007-0083913

(51) Int. Cl.
*H04B 7/14* (2006.01)
(52) U.S. Cl.
USPC ........................................... 455/24
(58) Field of Classification Search
USPC ........................................... 455/24
See application file for complete search history.

(56) References Cited

U.S. PATENT DOCUMENTS

| 8,170,470 B2 * | 5/2012 | Park et al. | 455/7 |
| 8,238,820 B2 * | 8/2012 | Park et al. | 455/24 |
| 2010/0311323 A1 * | 12/2010 | Park et al. | 455/10 |
| 2011/0070839 A1 * | 3/2011 | Eum et al. | 455/63.1 |

FOREIGN PATENT DOCUMENTS

| KR | 2005-0018053 A | 2/2005 |
| KR | 2006-0099846 A | 9/2006 |
| WO | WO-2007/078032 A1 | 7/2007 |

\* cited by examiner

*Primary Examiner* — Yuwen Pan
*Assistant Examiner* — Ankur Jain
(74) *Attorney, Agent, or Firm* — Rabin & Berdo, P.C.

(57) ABSTRACT

An on-channel repeating apparatus and method is provided. The method includes subtracting a replica of a feedback signal from a signal received from a main transmitter or another repeating apparatus; demodulating and equalizing the signal to remove noise, a multipath signal, and the remaining feedback signal from the signal; inserting identification signal having good correlation properties into the signal; modulating the signal; and transmitting the modulated signal.

16 Claims, 15 Drawing Sheets

ON-CHANNEL REPEATING APPARATUS AND METHOD

TECHNICAL FIELD

The present invention relates to an on-channel repeating apparatus and method. Particularly, the present invention relates to an on-channel repeating apparatus and method that repeats an output signal that is identical to an input signal through an on-channel.

The present invention is supported by the IT R&D program of MIC/IITA [2006-S-016-02, Development of Distributed Translator Technology for Terrestrial DTV].

BACKGROUND ART

Repeating apparatuses are installed in areas in which signals transmitted from a main transmitter are weak, amplify the signals transmitted from the main transmitter, and repeat the signals, thereby solving the problem of unstable reception and expanding the transmission range of the signals from the main transmitter.

FIG. 1 is a diagram illustrating the structure of a repeating system according to the related art in which different frequencies are used among repeating apparatuses.

When the main transmitter transmits signals of a frequency A, the repeating apparatuses (the first to fourth repeating apparatuses) repeat signals using different frequencies from the frequency A (frequencies B to E). In the repeating system according to the related art, since the repeating apparatuses use signals of different frequencies, a plurality of frequency bandwidths are used, and a large amount of frequency resources is consumed. As a result, the utilization of frequencies is lowered.

FIG. 2 is a diagram illustrating the structure of a repeating system according to the related art in which repeating apparatuses use the same frequency.

When the main transmitter transmits signals of a frequency A, the repeating apparatuses (the first to fourth repeating apparatuses) repeat signals using the frequency A. In order to repeat the signals through a common channel, the signals having the same frequency transmitted from the main transmitter and the repeating apparatuses should be individually identified.

When different signals in the same frequency bandwidth are used, it is difficult for the repeating apparatuses to remove an on-channel interference signal using their equalizers or other devices. When the signals transmitted from the main transmitter and the repeating apparatuses have a time delay that is more than a predetermined reference value, the equalizer cannot remove the delay signal. Therefore, in order to repeat the signals through the common channel, the same signal should be output from the repeating apparatuses and the main transmitter, and the time delay between the output signal from the main transmitter and the output signals from the repeating apparatuses should be small.

As the repeating apparatuses according to the related art, the following apparatuses are used: an RF amplification on-channel repeating apparatus, an IF conversion on-channel repeating apparatus, a SAW (surface acoustic wave) filter on-channel repeating apparatus, a modulation/demodulation on-channel repeating apparatus, and an equalization digital on-channel repeating apparatus. The problems of the above on-channel repeating apparatuses will be described with reference to FIGS. 3 to 7.

FIG. 3 is a diagram schematically illustrating the internal structure of the RF amplification on-channel repeating apparatus.

In the RF amplification on-channel repeating apparatus, a receiving antenna and an RF receiving module receive RF signals transmitted from a main transmitter, and an RF band pass filter filters signals in a predetermined band from the received RF signals. The filtered RF signals are amplified by a high power amplifying module, and then transmitted from a transmitting antenna through an on-channel.

FIG. 4 is a diagram schematically illustrating the internal structure of the IF conversion on-channel repeating apparatus.

In the IF conversion on-channel repeating apparatus, a receiving antenna and an RF receiving module receive RF signals transmitted from a main transmitter, and an IF down-converting module converts the received RF signals into intermediate frequency signals (hereinafter referred to as "IF signals") on the basis of a reference frequency supplied from a local oscillator. The converted IF signals are filtered by an IF band pass filter. Then, an RF up-converting module converts the IF signals filtered by the IF band pass filter into RF signals on the basis of the reference frequency supplied from the local oscillator. The converted RF signals are amplified by a high power amplifying module, and then transmitted from a transmitting antenna through an on-channel.

FIG. 5 is a diagram schematically illustrating the internal structure of the SAW filter on-channel repeating apparatus.

In the SAW filter on-channel repeating apparatus, a receiving antenna and an RF receiving module receive RF signals transmitted from a main transmitter, and an IF down-converting module converts the received RF signals into IF signals on the basis of a reference frequency supplied from a local oscillator. The IF signals are filtered by a SAW filter, and an RF up-converting module converts the IF signals filtered by the SAW filter into RF signals on the basis of the reference frequency output from the local oscillator. The converted RF signals are amplified by a high power amplifying module, and then transmitted from a transmitting antenna through an on-channel.

The RF amplification on-channel repeating apparatus, the IF conversion on-channel repeating apparatus, and the SAW filter on-channel repeating apparatus respectively shown in FIGS. 3 to 5 cannot remove, as an example, noise and multipath signals generated due to a transmission line between the main transmitter and the on-channel repeating apparatus and a feedback signal generated due to low isolation of the transmitting and receiving antennas. As a result, characteristics of output signals are lower than those of input signals. In addition, the feedback signal generated due to low isolation of the transmitting and receiving antennas limits the transmission power of the repeating apparatus.

FIG. 6 is a diagram schematically illustrating the internal structure of the modulation/demodulation on-channel repeating apparatus.

In the modulation/demodulation on-channel repeating apparatus, a receiving antenna and an RF receiving module receive RF signals transmitted from a main transmitter, and an IF down-converting module converts the received RF signal into IF signals on the basis of a reference frequency supplied from a local oscillator.

A demodulation module demodulates the IF signals into baseband signals, and an equalization and FEC (forward error correction) decoding module removes, from the demodulated baseband signals, noise and multipath signals generated due to a transmission line between the main transmitter and the modulation/demodulation on-channel repeating apparatus and a feedback signal generated due to low isolation of the transmitting and receiving antennas.

An FEC encoding module performs forward error correction coding (FEC coding) on the output signal from the equalization and FEC decoding module, and a modulation module modulates the signal that is subjected to the FEC coding into an IF signal. An RF up-converting module converts the IF signal into an RF signal on the basis of the reference frequency supplied from the local oscillator. The converted RF signal is amplified by a high power amplifying module and then transmitted from the transmitting antenna through an on-channel.

In this way, the modulation/demodulation on-channel repeating apparatus solves the problems of the multipath signals and noise generated from the repeating apparatuses shown in FIGS. 3 to 5 using the equalization and FEC decoding module. However, the FEC encoding module and the FEC decoding module may increase a time delay from the range of a micro-second to a milli-second according to their operations. In addition, since the feedback signal, which has an ambiguity of a standard trellis encoder of the FEC encoding module, is not removed in the repeating apparatus, the transmission power of the repeating apparatus is limited.

FIG. 7 is a diagram schematically illustrating the internal structure of the equalization digital on-channel repeating apparatus.

In the equalization digital on-channel repeating apparatus, a receiving antenna and an RF receiving module receive RF signals transmitted from the main transmitter, and an IF down-converting module converts the received RF signals into IF signals on the basis of a reference frequency supplied from a local oscillator.

A demodulation module demodulates the IF signals into baseband signals, and an equalizing module removes, from the demodulated baseband signals, noise and multipath signals generated due to a transmission line between the main transmitter and the equalization digital on-channel repeating apparatus and a feedback signal generated due to low isolation of the transmitting and receiving antennas.

A modulation module modulates the baseband signals from which the noise, the multipath signals, and the feedback signal are removed into IF signals, and an RF up-converting module converts the IF signals into RF signals on the basis of the reference frequency supplied from the local oscillator. The converted RF signals are amplified by a high power amplifying module and then transmitted from the transmitting antenna through an on-channel.

In the equalization digital on-channel repeating apparatus, when a feedback signal having an electric field intensity that is higher than that of an input signal is received, the equalizing module cannot remove the feedback signal, and the equalizing module is diverged, which causes errors in the operation of the repeating apparatus.

The above-mentioned on-channel repeating apparatuses shown in FIGS. 3 to 7 have limitations in their capabilities to remove the feedback signals. As a result, the utilization of the repeating apparatuses is lowered, and a large investment is required to improve the utilization of the repeating apparatuses.

The above information disclosed in this Background section is only for enhancement of understanding of the background of the invention and therefore it may contain information that does not form the prior art that is already known in this country to a person of ordinary skill in the art.

DETAILED DESCRIPTION

Technical Problem

The present invention has been made in an effort to provide an on-channel repeating apparatus and method that is capable of having an output signal that is identical to that of a main transmitter and a small delay time between the output signals, removing noise and multipath signals generated due to a transmission line between the main transmitter and on-channel repeating apparatus, and removing a feedback signal generated due to low isolation of the transmitting and receiving antennas.

Technical Solution

In order to achieve the technical object, according to a first exemplary embodiment of the present invention, there is provided an on-channel repeating apparatus for repeating signals received from a main transmitter or another repeating apparatus through an on-channel. The on-channel repeating apparatus includes: an identification signal generating unit that generates identification signals with good correlation properties; a feedback signal removing unit that generates a replica of a feedback signal on the basis of the signal received from the main transmitter or another repeating apparatus and the identification signal, and then removes the feedback signal using the generated replica; a demodulation unit that demodulates the signal delivered from the feedback signal removing unit into a baseband signal; an identification signal inserting unit that inserts the identification signal generated by the identification signal generating unit into the baseband signal; and a transmitting unit that transmits the baseband signal having the identification signal inserted thereinto.

According to a second exemplary embodiment of the present invention, there is provided an on-channel repeating apparatus for repeating signals received from a main transmitter or another repeating apparatus through an on-channel. The on-channel repeating apparatus includes: an identification signal generating unit that generates identification signals having good correlation properties; a demodulation unit that demodulates the signal received from the main transmitter or another repeating apparatus into a baseband signal; a feedback signal removing unit that generates a replica of a feedback signal on the basis of the baseband signal and the identification signal, and removes the feedback signal using the generated replica; an identification signal inserting unit that inserts the identification signal into the output signal in which the feedback signal is removed; and a transmitting unit that modulates the signal having the identification signal inserted thereinto and transmits the modulated signal.

According to a third exemplary embodiment of the present invention, there is provided an on-channel repeating apparatus for repeating signals received from a main transmitter or another repeating apparatus through an on-channel. The on-channel repeating apparatus includes: a receiving unit that converts RF signals received from the main transmitter or another repeating apparatus into baseband signals; an identification signal generating unit that generates identification signals with good correlation properties; a feedback signal removing unit that generates a replica of a feedback signal on the basis of the baseband signals and the identification signal, and removes the feedback signal using the replica; a demodulation unit that performs frequency and timing synchronization on the signal delivered from the feedback signal removing unit to generate a carrier frequency offset; an identification signal inserting unit that inserts the identification signal generated by the identification signal generating unit into the demodulated signal; a transmitting unit that modulates the baseband signal having the identification signal inserted thereinto into an RF signal and transmits the RF signal; and a local oscillator that is provided between the receiving unit and the transmitting unit and supplies a reference frequency for conversion between the RF signal and the baseband signal.

According to a fourth exemplary embodiment of the present invention, there is provided an on-channel repeating method of repeating signals received from a main transmitter or another repeating apparatus through an on-channel. The method includes: subtracting a replica of a feedback signal from the signal received from the main transmitter or another repeating apparatus; converting the signal from which the replica of the feedback signal is subtracted into a baseband signal; equalizing the baseband signal to remove noise, a multipath signal, and the remaining feedback signal from the signal; generating identification signals having good correlation properties, and inserting the generated identification signal into the equalized baseband signals; and modulating the baseband signals having the identification signal inserted thereinto and transmitting the modulated signals.

Advantageous Effects

According to the above-described embodiments of the invention, the repeating apparatus amplifies and repeats an output signal that is identical to that of the main transmitter and has a small time delay and whose distortion generated in a transmission channel is corrected. Therefore, it is possible to improve the utilization of limited frequency resources and reduce investment in achieving a repeating apparatus.

MODE FOR INVENTION

Figure 1:
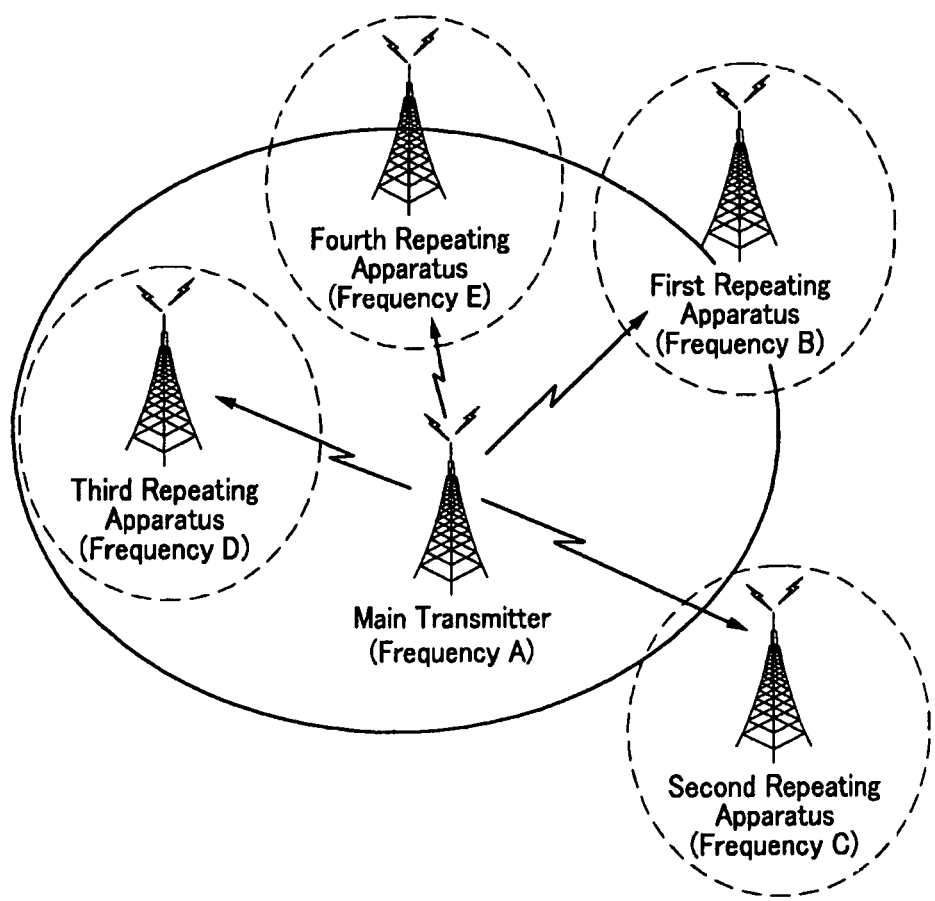
FIG. 1 is a diagram illustrating the structure of a repeating system according to a related art in which different frequencies are used among repeating apparatuses.
Figure 2:
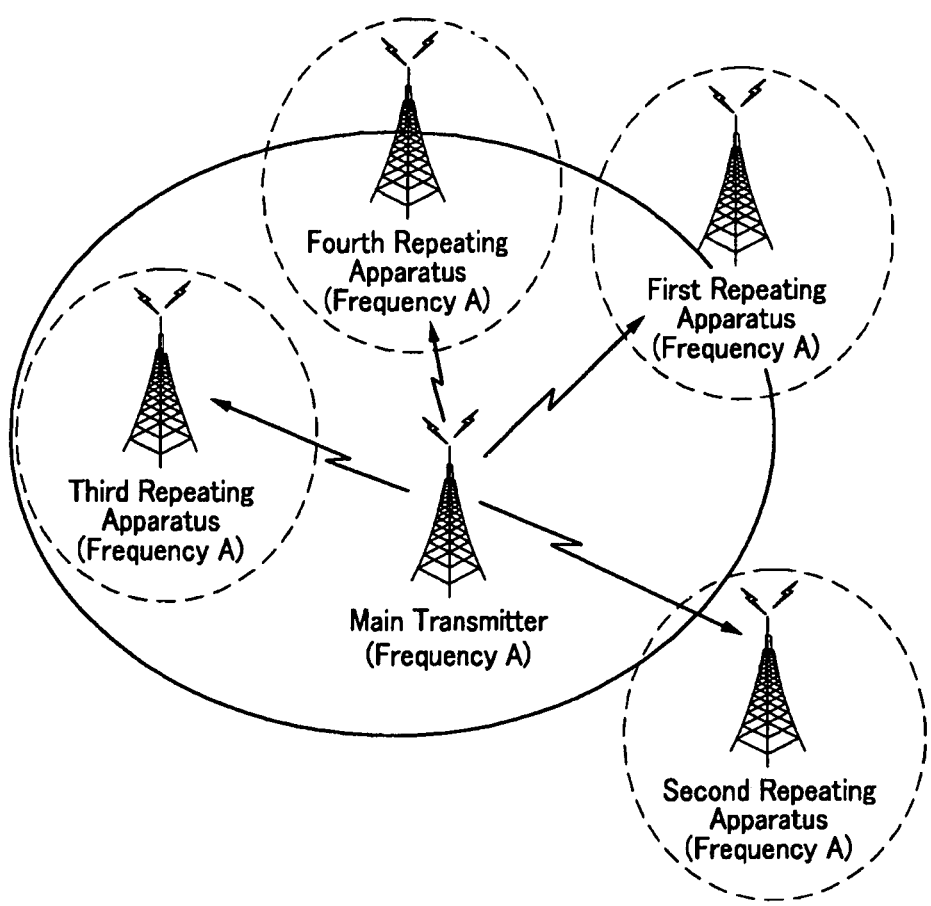
FIG. 2 is a diagram illustrating the structure of a repeating system according to a related art in which repeating apparatuses use the same frequency.
Figure 3:
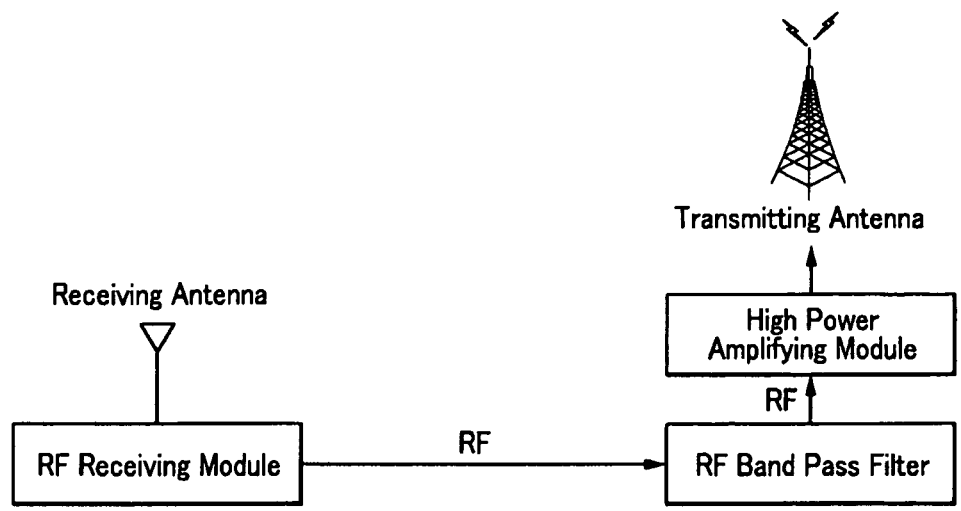
FIG. 3 is a diagram schematically illustrating the internal structure of an RF amplification on-channel repeating apparatus.
Figure 4:
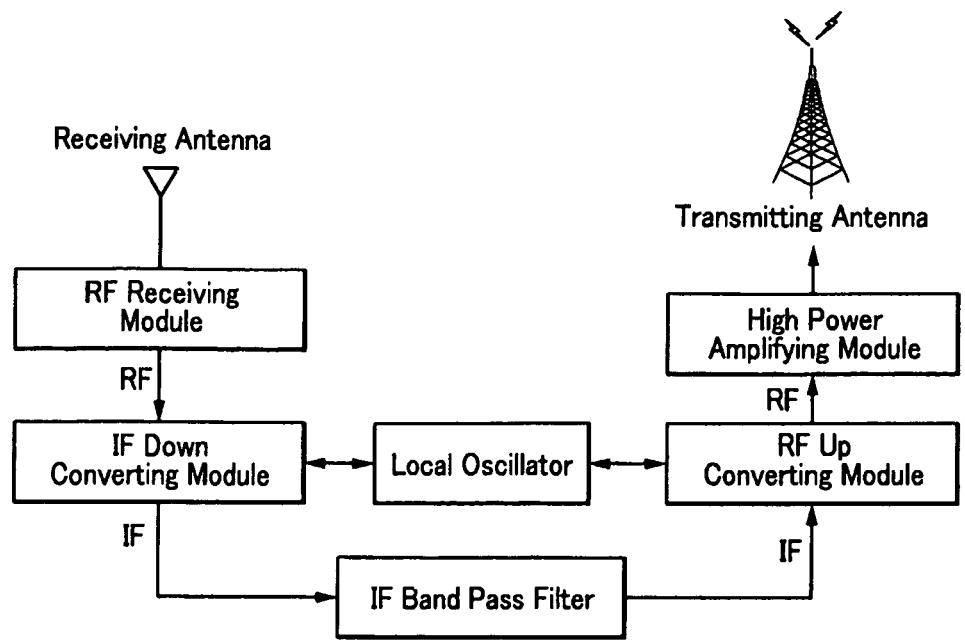
FIG. 4 is a diagram schematically illustrating the internal structure of an IF conversion on-channel repeating apparatus.
Figure 5:
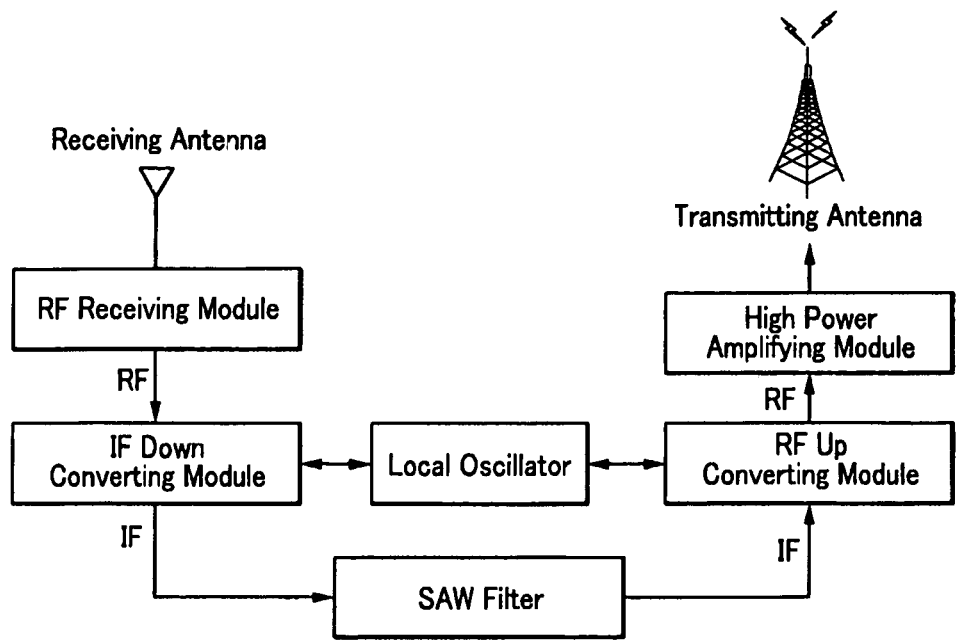
FIG. 5 is a diagram schematically illustrating the internal structure of a SAW filter on-channel repeating apparatus.
Figure 6:
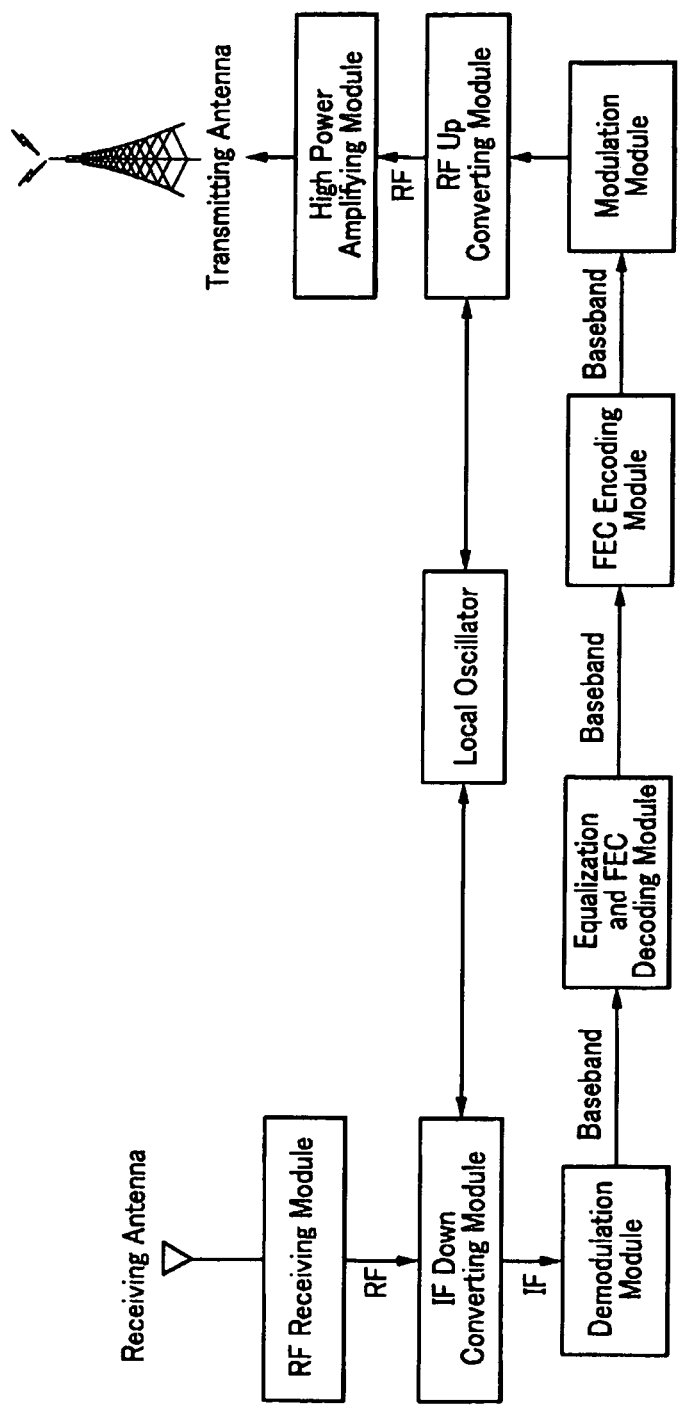
FIG. 6 is a diagram schematically illustrating the internal structure of a modulation/demodulation on-channel repeating apparatus.
Figure 7:
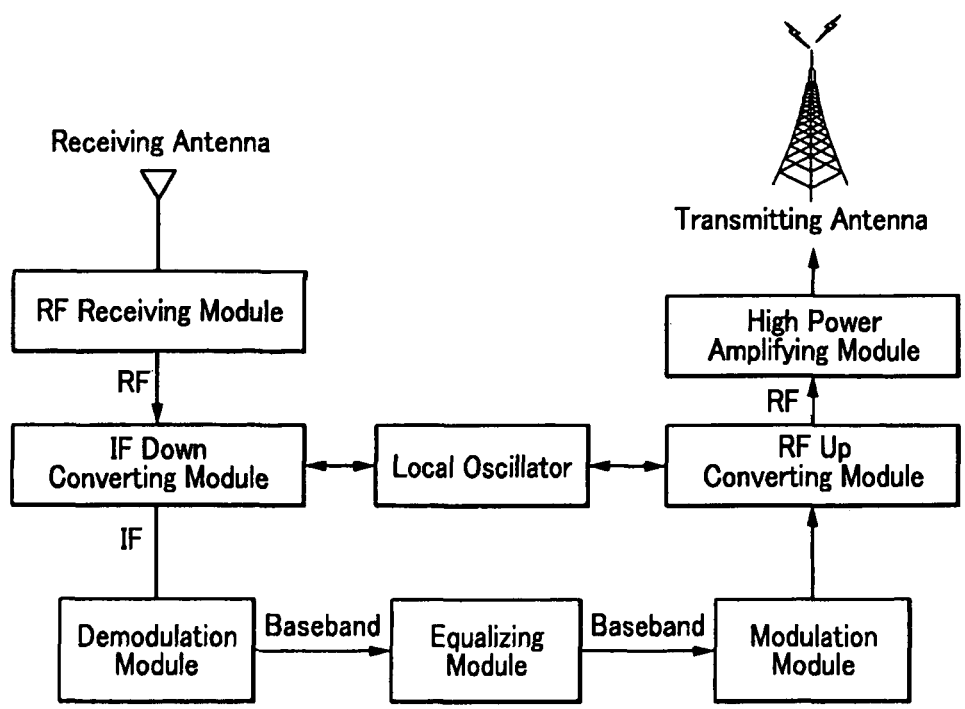
FIG. 7 is a diagram schematically illustrating the internal structure of an equalization digital on-channel repeating apparatus.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprises" and/or "comprising" when used in this specification specify the presence of stated features, integers, steps, operations, elements, and/or components, but do not preclude the presence or addition of one or more other features, integers, steps, operations, elements, components, and/or groups thereof. In addition, the suffixes "-er" and "-or" and the term "module" described in the specification mean units for processing at least one function and operation, and can be implemented by hardware components or software components, and combinations thereof.

Figure 8:
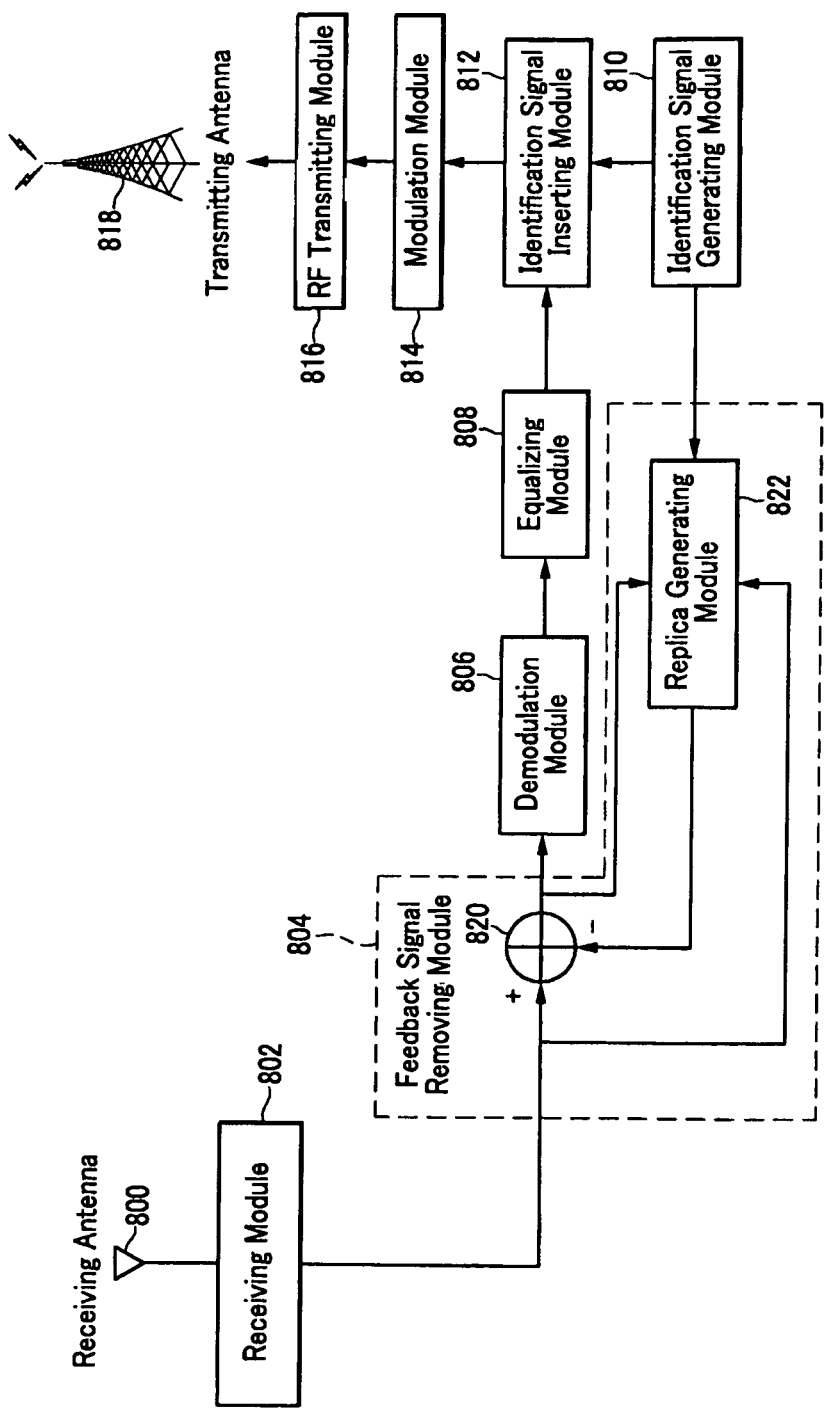
FIG. 8 is a diagram illustrating the structure of an on-channel repeating apparatus according to a first exemplary embodiment of the present invention.

FIG. 8 is a schematic diagram illustrating the structure of an on-channel repeating apparatus according to a first exemplary embodiment of the present invention.

An on-channel repeating apparatus according to an exemplary embodiment of the present invention includes a receiving antenna 800, a receiving module 802, a feedback signal removing module 804, a demodulation module 806, an equalizing module 808, an identification signal generating module 810, an identification signal inserting module 812, a modulation module 814, an RF transmitting module 816, and a transmitting antenna 818.

The receiving antenna 800 receives signals from a main transmitter or another repeating apparatus, and the receiving module 802 down-converts the signals received by the receiving antenna 800 into signals in a predetermined band. Here, a feedback signal generated due to low isolation of the transmitting and receiving antennas 800 and 818 is included in the receive signal.

The feedback signal removing module 804 generates a replica from the signals down-converted into the predetermined band by the receiving module 802 and an identification signal generated by the identification signal generating module 810, and uses the generated replica to remove the feedback signal from the received signal. For this purpose, the feedback signal removing module 804 includes a subtracting module 820 and a replica generating module 822.

The subtracting module 820 subtracts the replica of a feedback signal from the signal down-converted into the predetermined band by the receiving module 802 to primarily remove the feedback signal. For this purpose, the subtracting module 820 receives the replica from the replica generating module 822.

The replica generating module 822 generates the replica of a feedback signal on the basis of an input signal to the subtracting module 820, the signal from which the feedback signal is primarily removed by the subtraction of replica by the subtracting module 820, and the identification signal generated by the identification signal generating module 810, and feeds back the generated replica to the subtracting module 820.

The demodulation module 806 demodulates signals delivered from the feedback signal removing module 804 into baseband signals.

The equalizing module 808 equalizes the signals demodulated by the demodulation module 806 to remove noise and multipath signals of a reception channel of the repeating apparatus and the remaining feedback signal.

The identification signal generating module 810 generates identification signals having good correlation properties in order to identify a plurality of transmitters or repeating apparatuses and control a network.

In this embodiment, v(i) and t(i), which are signals having good correlation properties, have auto-correlation ($R_v(\tau)$) properties indicating correlation with their sequences, which can be expressed by Equation 1 given below:

$$|R_v(\tau)| = \begin{cases} N, & \tau = 0 \\ \text{small}, & 1 \leq \tau \leq N-1 \end{cases}$$ (Equation 1)

$$R_v(\tau) = \sum_{i=0}^{M-1} v(i) \cdot v(i-\tau)$$

(where M indicates the length of a signal v(i)).

A cross-correlation ($R_{v,t}(\tau)$) indicating correlation with other sequences can be expressed by Equation 2 given below:

$$|R_v(\tau)| = \text{small, all } \tau$$ (Equation 2)

$$R_v(\tau) = \sum_{i=0}^{M-1} v(i) \cdot t(i-\tau)$$

(where M indicates the lengths of the signals v(i) and t(i)).

That is, if an auto-correlation value ($R_v(0)=N$) when the sequences are synchronized with each other ($\tau=0$) is sufficiently larger than an auto-correlation value ($R_v(\tau)$, $\tau \neq 0$) when the sequences are not synchronized with each other and a cross-correlation value ($R_v(\tau)$ all $\tau$), signals that are easy to detect can be determined to have good correlation properties.

In this case, as an example, an M-sequence, a Kasami sequence, and a Gold sequence can be used as sequences having good correlation properties. Particularly, in an ATSC DTV (Advanced Television System Committee Digital TV) standard, the Kasami sequence having a length of 65,535 is used as the sequence with good correlation properties. The structure of the identification signal generating module 810 generating such a Kasami sequence will be described in detail with reference to FIG. 15.

The identification signal inserting module 812 inserts the identification signal with good correlation properties that are generated by the identification signal generating module 810 according to Equation 3 into an output signal from the equalizing module 810, and delivers the signal to the modulation module 814.

$$w(n) = eq(n) + \alpha \cdot v(n)$$ (Equation 3)

(where w(n) is an output signal from the identification signal inserting module 812 in a time index n, v(n) indicates signals with good correlation properties in the time index n, eq(n) indicates an output signal from the equalizing module 808 in the time index n, and α is a constant that determines the insertion size of the identification signal).

The modulation module 814 modulates the signal output from the identification signal inserting module 812 into an IF signal.

The RF transmitting module 816 converts the IF signal modulated by the modulation module 814 into an RF signal and wirelessly transmits the RF signal through the transmitting antenna 818.

Figure 9:
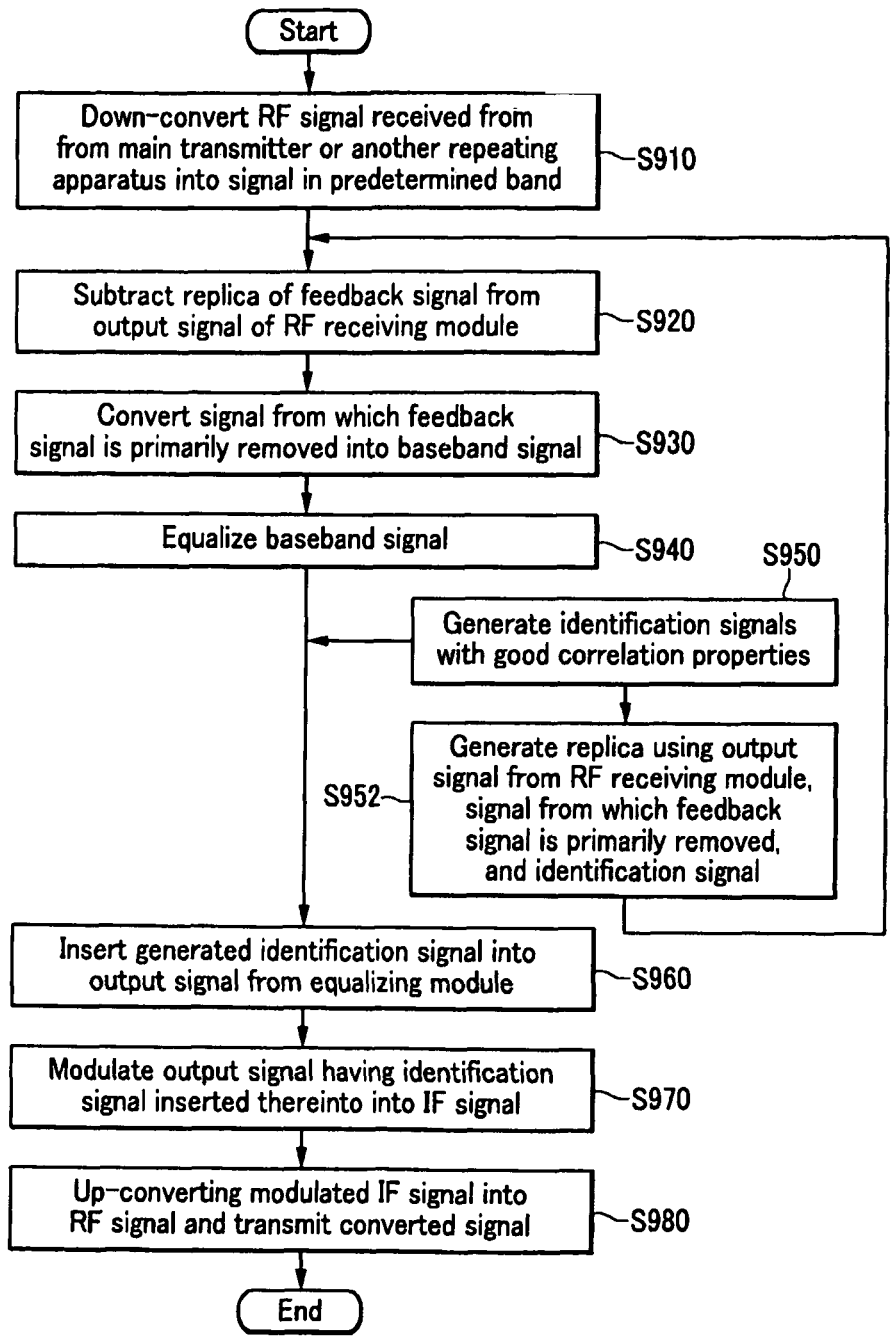
FIG. 9 is a flowchart illustrating a signal repeating method in the on-channel repeating apparatus according to the exemplary embodiment of the present invention.

FIG. 9 is a flowchart illustrating a signal repeating method in the on-channel repeating apparatus according to an exemplary embodiment of the present invention.

When the receiving antenna 800 receives the signals transmitted from the main transmitter or another adjacent repeating apparatus, the receiving module 802 down-converts the received signals into signals in a predetermined band (S910).

The subtracting module 820 subtracts the replica of the feedback signal generated by the replica generating module 822 from the output signal from the receiving module 802 to primarily remove the feedback signal from the output signal of the receiving module 802 (S920).

The output signal of the receiving module 802 from which the feedback signal is primarily removed is demodulated into a baseband signal by the demodulation module 806 (S930), and the equalizing module 808 equalizes the demodulated baseband signal in order to remove noise, a multipath signal, and the remaining feedback signal that are generated from the data transmission between repeating apparatuses (S940).

The identification signal generating module 810 generates identification signals having good correlation properties in order to identify a plurality of transmitters or repeating apparatuses and control a network, and delivers the generated identification signal to the identification signal inserting module 812 (S950).

The identification signal inserting module 812 inserts the identification signal delivered from the identification signal generating module 810 into the output signal from the equalizing module 808 (S960).

The output signals having the identification signal with good correlation properties inserted thereinto are modulated into IF signals by the modulation module 814 (S970), and then up-converted into RF signals by the RF transmitting module 816. The up-converted RF signal is wirelessly transmitted through the transmitting antenna 818 (S980).

In step S950, the identification signal with good correlation properties that are generated by the identification signal generating module 810 are delivered to the replica generating module 822, and the replica generating module 822 generates a replica on the basis of the output signal from the receiving module 802, the output signal from which the feedback signal is primarily removed by the subtracting module 820, and the identification signal with good correlation properties that are generated by the identification signal generating module 810, and feeds back the generated replica to the subtracting module 820. Then, the subtracting module 820 performs step S920 using the feedback replica (S952).

The on-channel repeating apparatus can repeat the above-mentioned process to repeat the signal received from the main transmitter or another repeating apparatus using the same channel.

Figure 10:
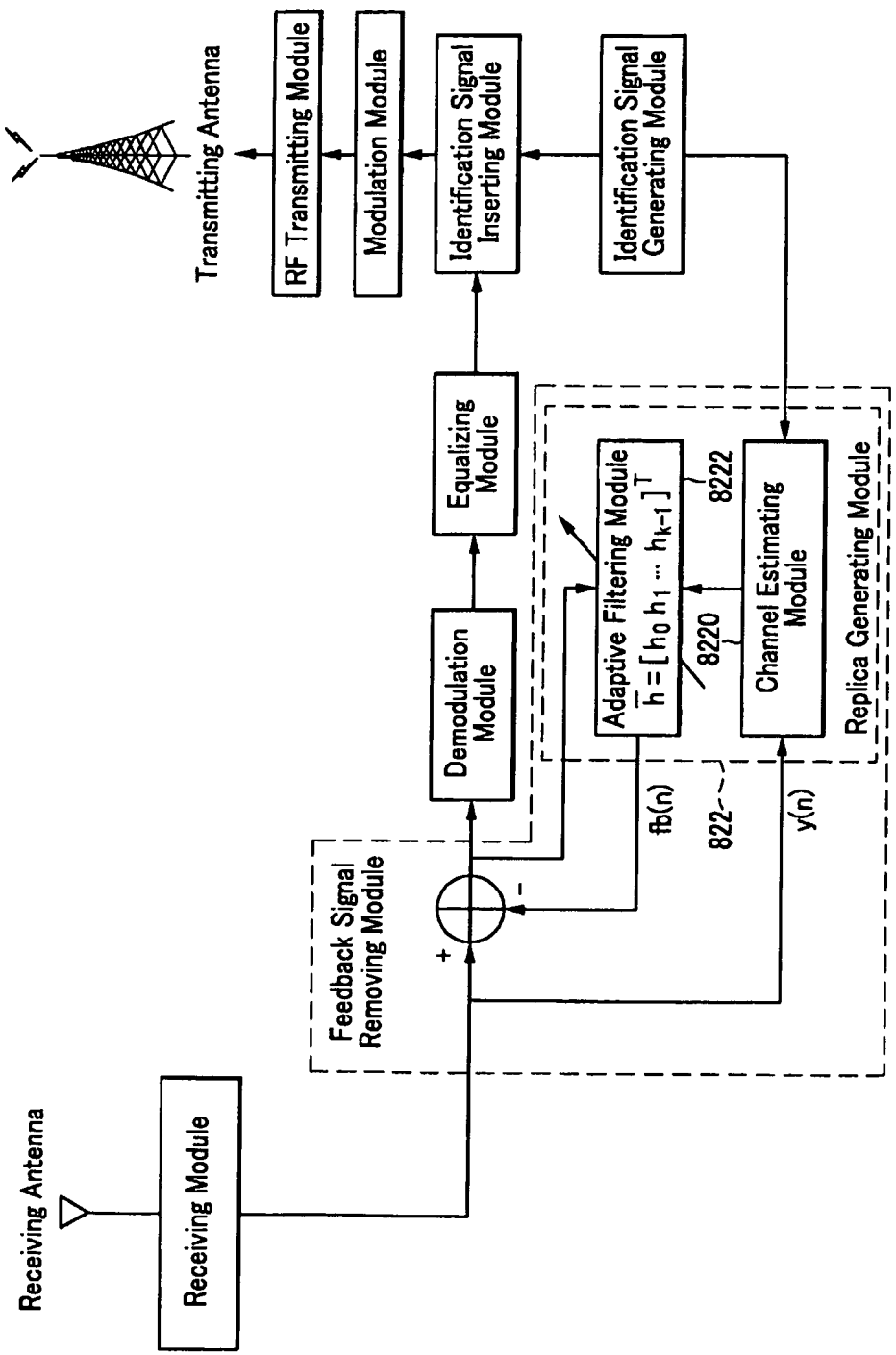
FIG. 10 is a diagram illustrating the structure of the on-channel repeating apparatus, in which the structure of a replica generating module is shown in detail.

FIG. 10 is a diagram illustrating the structure of the on-channel repeating apparatus, in which the replica generating module is shown in detail.

The replica generating module 822 according to this exemplary embodiment of the present invention includes a channel estimating module 8220 and an adaptive filtering module 8222.

The channel estimating module 8220 generates a filter tap coefficient on the basis of the identification signal generated by the identification signal generating module 810 and the output signal from the receiving module 802.

The adaptive filtering module 8222 uses the filter tap coefficient generated by the channel estimating module 8220 to filter the output signal from the subtracting module 820, thereby generating the replica of the feedback signal.

The adaptive filtering module 8222 generates the replica (fb(n)) of the feedback signal according to Equation 4, on the basis of a filter tap coefficient vector ($\overline{h_n} = [h_0(n) h_1(n) \ldots h_{K-1}(n)]^T$) output from the channel estimating module 8220 in the time index n and a signal vector ($\overline{\epsilon_n} = [\epsilon_0(n) \epsilon_1(n) \ldots \epsilon_{K-1}(n)]^T$) output from the subtracting module 820 in the time index n.

$$fb(n) = \overline{h_n}^T \cdot \overline{\epsilon_n} \quad \text{(Equation 4)}$$

(where T indicates a transpose).

The subtracting module 820 subtracts the replica (fb(n)) of the feedback signal output from the adaptive filtering module 8222 from the output signal (r(n)) from the receiving module 802 according to Equation 5 to primarily remove the feedback signal generated due to low isolation of the transmitting antenna and the receiving antenna.

$$\epsilon(n+1) = r(n) - fb(n) \quad \text{(Equation 5)}$$

Figure 11:
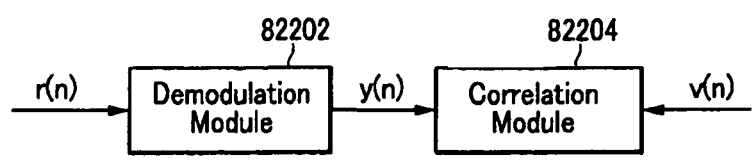
FIG. 11 is a diagram illustrating the structure of a channel estimating module including a demodulation module and a correlation module in the on-channel repeating apparatus according to the exemplary embodiment of the present invention.

FIG. 11 is a diagram illustrating the structure of the channel estimating module including a demodulation module and a correlation module in the on-channel repeating apparatus according to the exemplary embodiment of the present invention.

The channel estimating module 8220 according to the exemplary embodiment of the present invention includes a demodulation module 82202 and a correlation module 82204.

The demodulation module 82202 demodulates the output signal (r(n)) from the receiving module 802 into a baseband signal (y(n)) through a desynchronizing (frequency synchronization and timing synchronization) process.

The correlation module 82204 generates a filter tap coefficient vector ($\overline{h_n} = [h_0(n) h_1(n) \ldots h_{K-1}(n)]^T$) of the adaptive filtering module 8222 using a direct correlation algorithm according to the following Equation 6, on the basis of the baseband signal (y(n)) demodulated by the demodulation module 82202 and the identification signal (v(n)) generated by the identification signal generating module 810:

$$h_\tau = \text{corr}(\overline{y_\tau}, \overline{v_{PM}}) \quad \text{(Equation 6)}$$

$$= \sum_{i=0}^{PM} y(b_0 + \tau + i) \cdot v(i)$$

$$\overline{y_\tau} = [y(b_0 + \tau) y(b_0 + \tau + 1) \ldots y(b_0 + \tau + PM - 1)]^T$$

$$\overline{v_{PM}} = [v(0) v(1) \ldots v(PM - 1)]^T$$

(where PM(≦M) indicates the length of a signal used for correlation, and $b_0$ is the start point of the signal).

In this embodiment, as shown in FIG. 11, the channel estimating module 8220 includes the demodulation module 82202 and the correlation module 82204, but the invention is not limited thereto. The channel estimating module 8220 may include a correlation module and a modulation module.

Figure 12:
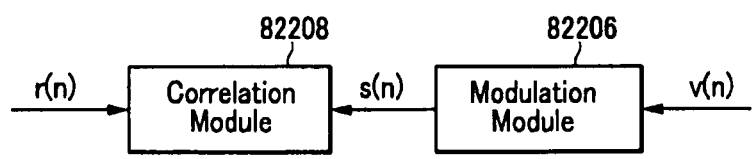
FIG. 12 is a diagram illustrating the structure of a channel estimating module including a modulation module and a correlation module in the on-channel repeating apparatus according to the exemplary embodiment of the present invention.

FIG. 12 is a diagram illustrating the structure of the channel estimating module including the modulation module and the correlation module in the on-channel repeating apparatus according to the exemplary embodiment of the present invention.

A modulation module 82206 modulates the identification signal (v(n)) generated by the identification signal generating module 810 into a signal (s(n)) in the same band as that of the output signal (r(n)) from the receiving module 802.

A correlation module 82208 generates a filter tap coefficient vector ($\overline{h_n} = [h_0(n) h_1(n) \ldots h_{K-1}(n)]^T$), of the adaptive filtering module 8222 using a direct correlation algorithm according to the following Equation 7, on the basis of a predetermined band signal (s(n)) modulated by the modulation module 82206 and the output signal (r(n)) from the receiving module 802.

$$h_\tau = \text{corr}(\overline{r_\tau}, \overline{s_{PM*Om}}) \quad \text{(Equation 7)}$$

$$= \sum_{i=0}^{PM*Om} r(b_0 + \tau + i) \cdot s(i)$$

$$\overline{r_\tau} = [r(b_0 + \tau) r(b_0 + \tau + 1) \ldots r(b_0 + \tau + PM*Om - 1)]^T$$

$$\overline{s_{PM}} = [s(0) s(1) \ldots s(PM*Om - 1)]^T$$

(where PM(≦M) indicates the length of a signal used for correlation, $b_0$ indicates the start point of the signal, and Om indicates the over-sampling ratio of the modulation module)

In the on-channel repeating apparatus according to the exemplary embodiment of the present invention, the demodulation module 806 may be arranged before the subtracting module 820.

Figure 13:
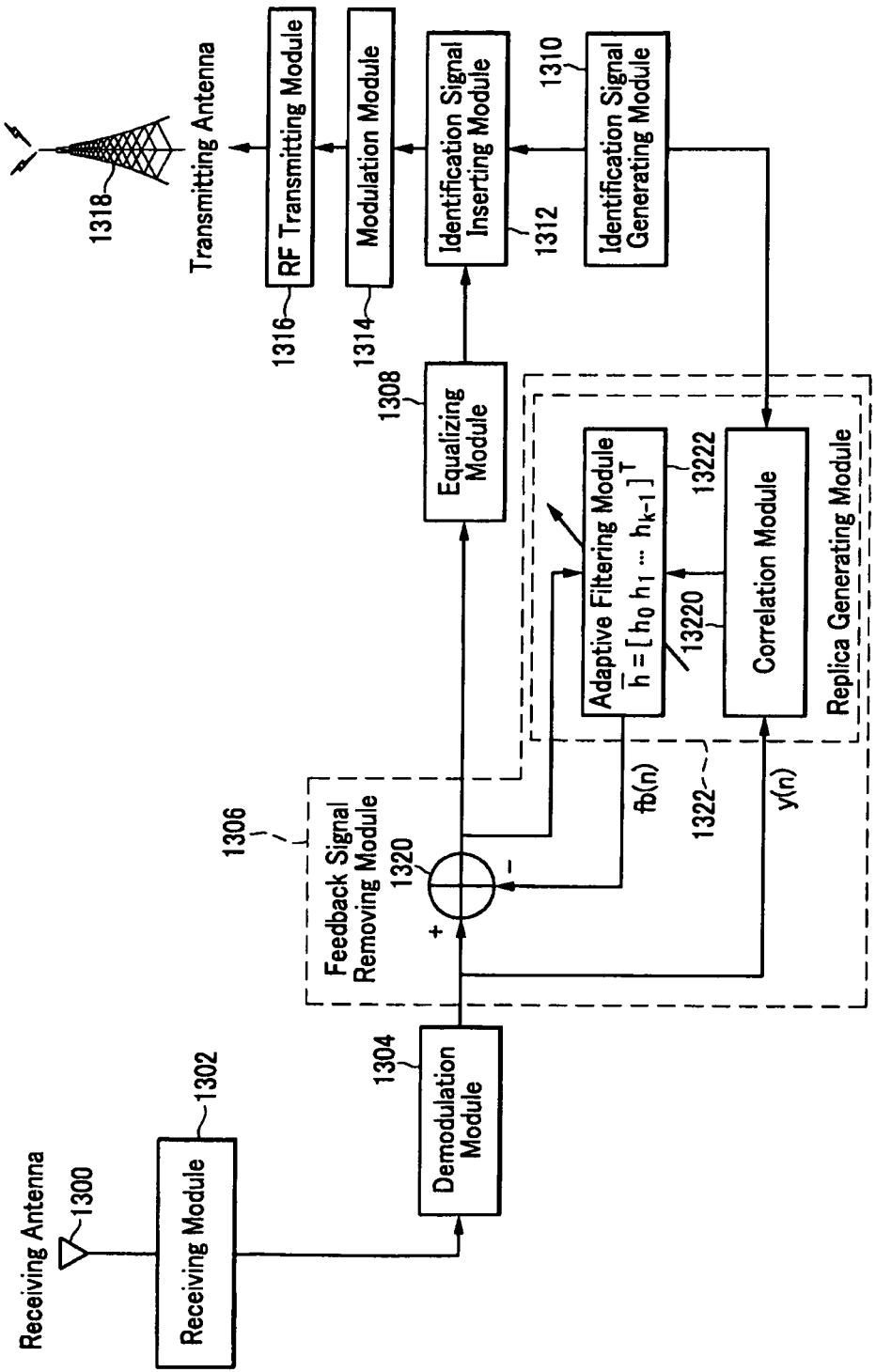
FIG. 13 is a diagram illustrating the structure of an on-channel repeating apparatus according to a second exemplary embodiment of the present invention.

FIG. 13 is a diagram illustrating the structure of an on-channel repeating apparatus according to a second exemplary embodiment of the present invention.

The on-channel repeating apparatus according to the second exemplary embodiment of the present invention includes a receiving antenna 1300, a receiving module 1302, a demodulation module 1304, a feedback signal removing module 1306, an equalizing module 1308, an identification signal generating module 1310, an identification signal inserting module 1312, a modulation module 1314, an RF transmitting module 1316, and a transmitting antenna 1318. The feedback signal removing module 1306 includes a subtracting module 1320 and a replica generating module 1322. The replica generating module 1322 includes a correlation module 13220 and an adaptive filtering module 13222.

In the second embodiment, the receiving antenna 1300, the receiving module 1302, the equalizing module 1308, the identification signal generating module 1310, the identification signal inserting module 1312, the modulation module 1314, the RF transmitting module 1316, the transmitting antenna 1318, the subtracting module 1320, and the adaptive filtering module 13222 of the replica generating module 1322 have the same functions as the receiving antenna 800, the receiving module 802, the equalizing module 808, the identification signal generating module 810, the identification signal inserting module 812, the modulation module 814, the RF transmitting module 816, the transmitting antenna 818, the subtracting module 820, and the adaptive filtering module 8222 of the replica generating module 822 in the on-channel repeating apparatus according to the first embodiment, respectively, and thus a detailed description thereof will be omitted.

The demodulation module 1304 demodulates an output signal (r(n)) from the receiving module 1302 into a baseband signal (y(n)) by desynchronization. The subtracting module 1320 subtracts the replica of a feedback signal from the demodulated baseband signal (y(n)).

The correlation module 13220 generates a filter tap coefficient vector ($\overline{h}_n = [h_0(n) h_1(n) \ldots h_{K-1}(n)]^T$) of the adaptive filtering module 13222 using a direct correlation algorithm according to Equation 6, on the basis of the baseband signal (y(n)) demodulated by the demodulation module 1304 and an identification signal (v(n)) generated by the identification signal generating module 1310.

The adaptive filtering module 13222 uses the filter tap coefficient generated by the correlation module 13220 to filter an output signal from the subtracting module 1320, thereby generating the replica of the feedback signal.

Figure 14:
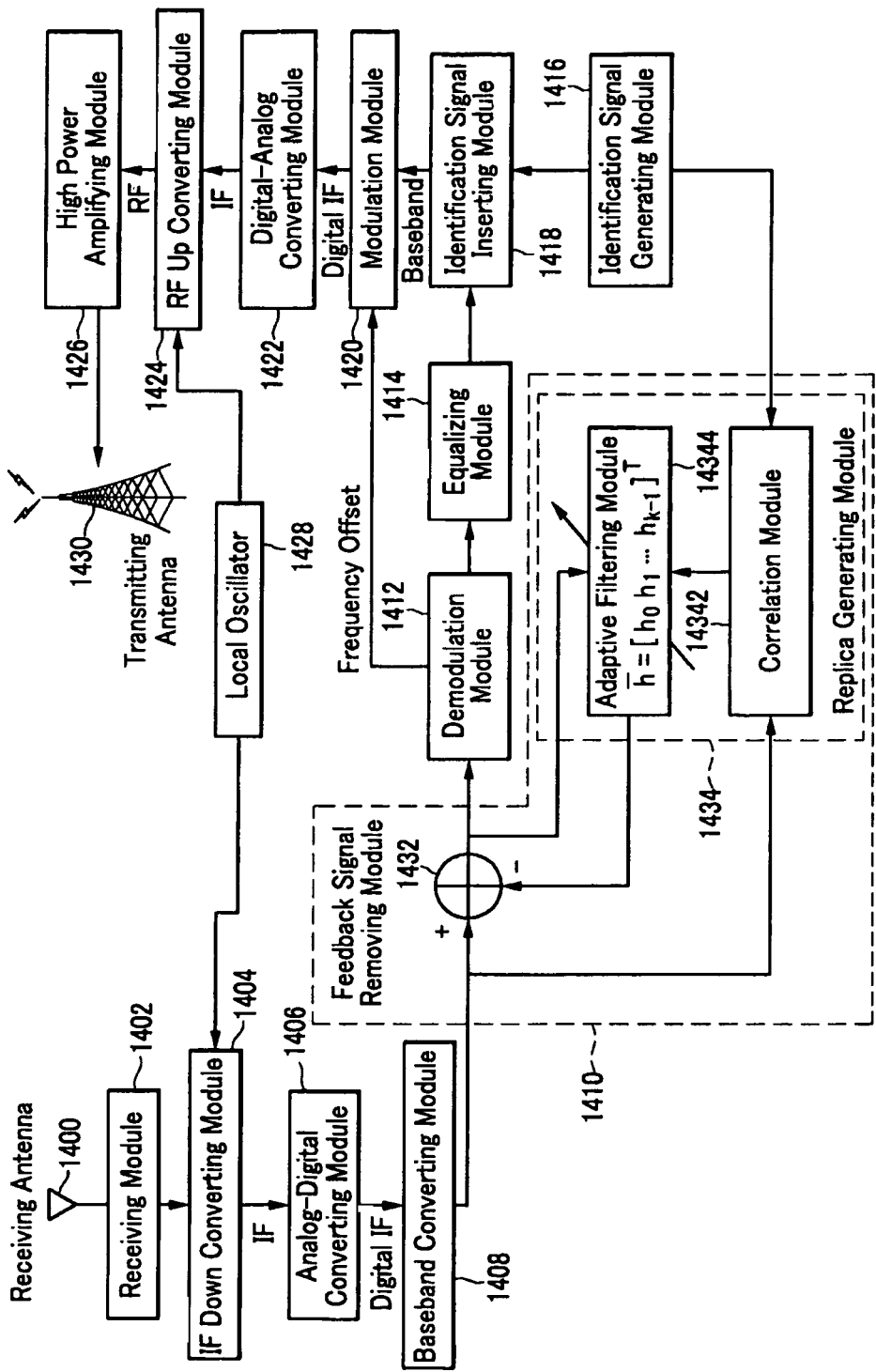
FIG. 14 is a diagram illustrating the structure of an on-channel repeating apparatus according to a third exemplary embodiment of the present invention.

FIG. 14 is a diagram illustrating the structure of an on-channel repeating apparatus according to a third exemplary embodiment of the present invention.

The on-channel repeating apparatus according to the third exemplary embodiment of the present invention includes a receiving antenna 1400, a receiving module 1402, an IF down-converting module 1404, an analog-digital converting module 1406, a baseband-converting module 1408, a feedback signal removing module 1410, a demodulation module 1412, an equalizing module 1414, an identification signal generating module 1416, an identification signal inserting module 1418, a modulation module 1420, a digital-analog-converting module 1422, an RF up-converting module 1424, a high power amplifying module 1426, a local oscillator 1428, and a transmitting antenna 1430.

The receiving module 1402 receives signals transmitted from the transmitter or another repeating apparatus through the receiving antenna 1400, and the IF down-converting module 1404 down-converts the received signals into IF signals on the basis of a reference frequency supplied from the local oscillator 1428.

The analog-digital-converting module 1406 converts an analog IF signal output from the IF down-converting module 1404 into a digital IF signal, and the baseband-converting module 1408 converts the digital IF signal output from the analog-digital-converting module 1406 into a baseband signal.

The feedback signal removing module 1410 generates a replica from the baseband signal converted by the baseband-converting module 1408 and an identification signal generated by the identification signal generating module 1416, and uses the generated replica to remove a feedback signal. For this purpose, the feedback signal removing module 1410 includes a subtracting module 1432 and a replica generating module 1434.

The subtracting module 1432 subtracts the replica of the feedback signal from the baseband signal converted by the baseband-converting module 1408 to primarily remove the feedback signal.

The replica generating module 1434 generates the replica of the feedback signal on the basis of an input signal to the subtracting module 1432, the signal from which the feedback signal is primarily removed by the subtraction of the replica by the subtracting module 1432, and the identification signal generated by the identification signal generating module 1416, and feeds back the generated replica to the subtracting module 1432. The replica generating module 1434 includes a channel estimating module 14342 and an adaptive filtering module 14344.

As described above, the structure and function of the replica generating module 1434 are the same as those of the replica generating module 822 in the on-channel repeating apparatus according to the first exemplary embodiment of the present invention shown in FIG. 8 to FIG. 12.

The demodulation module 1412 modulates the signal output from the feedback signal removing module 1410 through frequency and timing synchronization to generate a carrier frequency offset. In this case, the generated carrier frequency offset is delivered to the modulation module 1420.

The equalizing module 1414 removes noise and multipath signals of a reception channel of the repeating apparatus and the remaining feedback signal after primary removal from the signal subjected to the frequency and timing synchronization by the demodulation module 1412.

The identification signal generating module 1416 generates identification signals having good correlation properties according to Equations 1 and 2 in order to identify a plurality of transmitters or repeating apparatuses and control a network. The identification signal inserting module 1418 inserts the identification signal generated by the identification signal generating module 1416 according to Equation 3 into an output signal from the equalizing module 1414, and delivers the signal to the modulation module 1420.

The modulation module 1420 uses the carrier frequency offset delivered from the demodulation module 1412 to modulate the output signal from the identification signal inserting module 1418 into a digital IF signal, and the digital-analog-converting module 1422 converts the digital IF signal delivered from the modulation module 1420 into an analog IF signal.

The RF up-converting module 1424 up-converts the analog IF signal delivered from the digital-analog-converting module 1422 into an RF signal on the basis of a reference frequency supplied from the local oscillator 1428. The high power amplifying module 1426 amplifies the up-converted RF signal, and wirelessly transmits the amplified signal through the transmitting antenna 1430.

Figure 15:
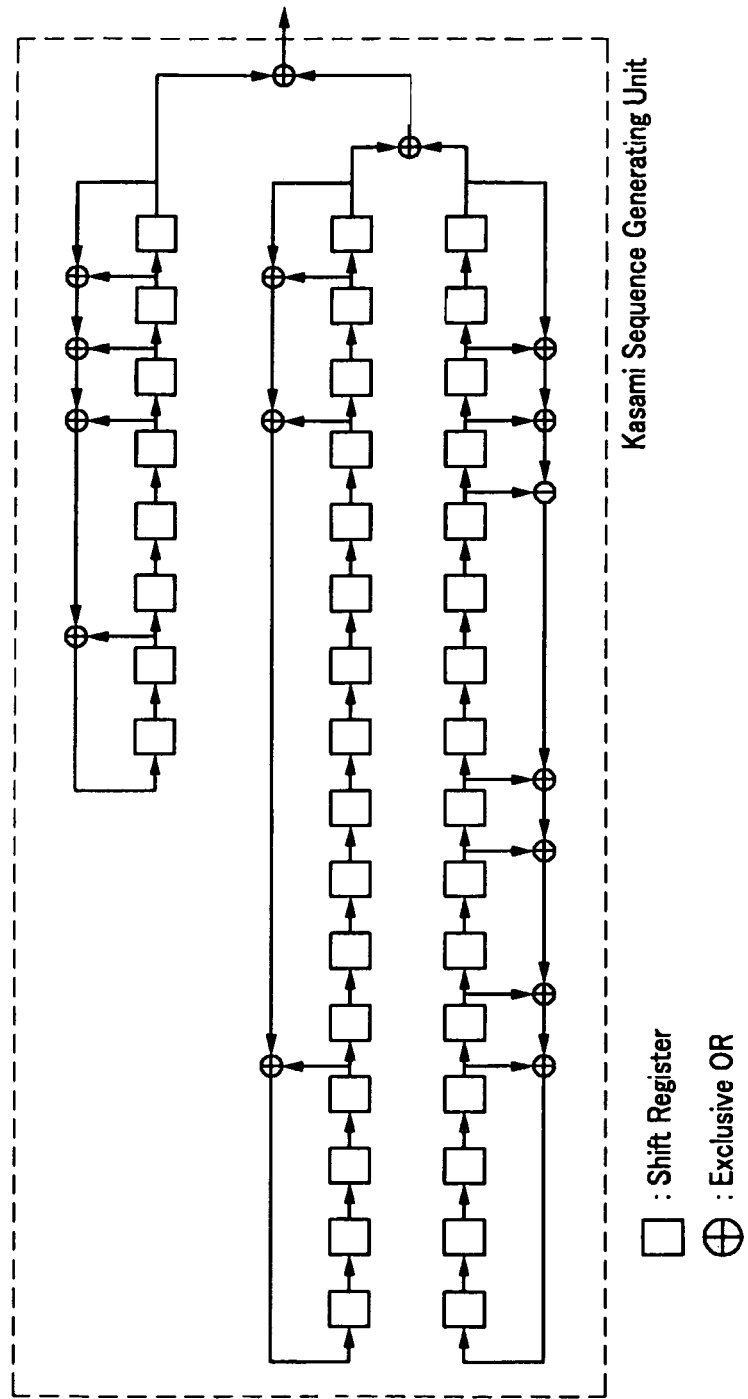
FIG. 15 is a diagram schematically illustrating the structure of an identification signal generating module of the on-channel repeating apparatus according to the exemplary embodiment of the present invention.

FIG. 15 is a diagram schematically illustrating the structure of the identification signal generating module of the on-channel repeating apparatus according to the exemplary embodiment of the present invention.

The identification signal generating module 810 or 1416 according to the exemplary embodiments of the present invention includes a plurality of shift registers and a plurality of XOR (exclusive OR) circuits. The structure of the identification signal generating module 810 or 1416 shown in FIG. 15 is the same as that of a module for generating the Kasami sequence that is used as identification signals in the ATSC DTV standard, which can be expressed by Equation 8:

$|K_L| = 16,777,471$,  (Equation 8)

M=65,535, maximum correlation value=65,535, and correlation value except for maximum correlation value={511,255,−1,−257,−531}, (where $|K_L|$ indicates the number of Kasami sequences, and M indicates the length of the Kasami sequences).

Figure 16:
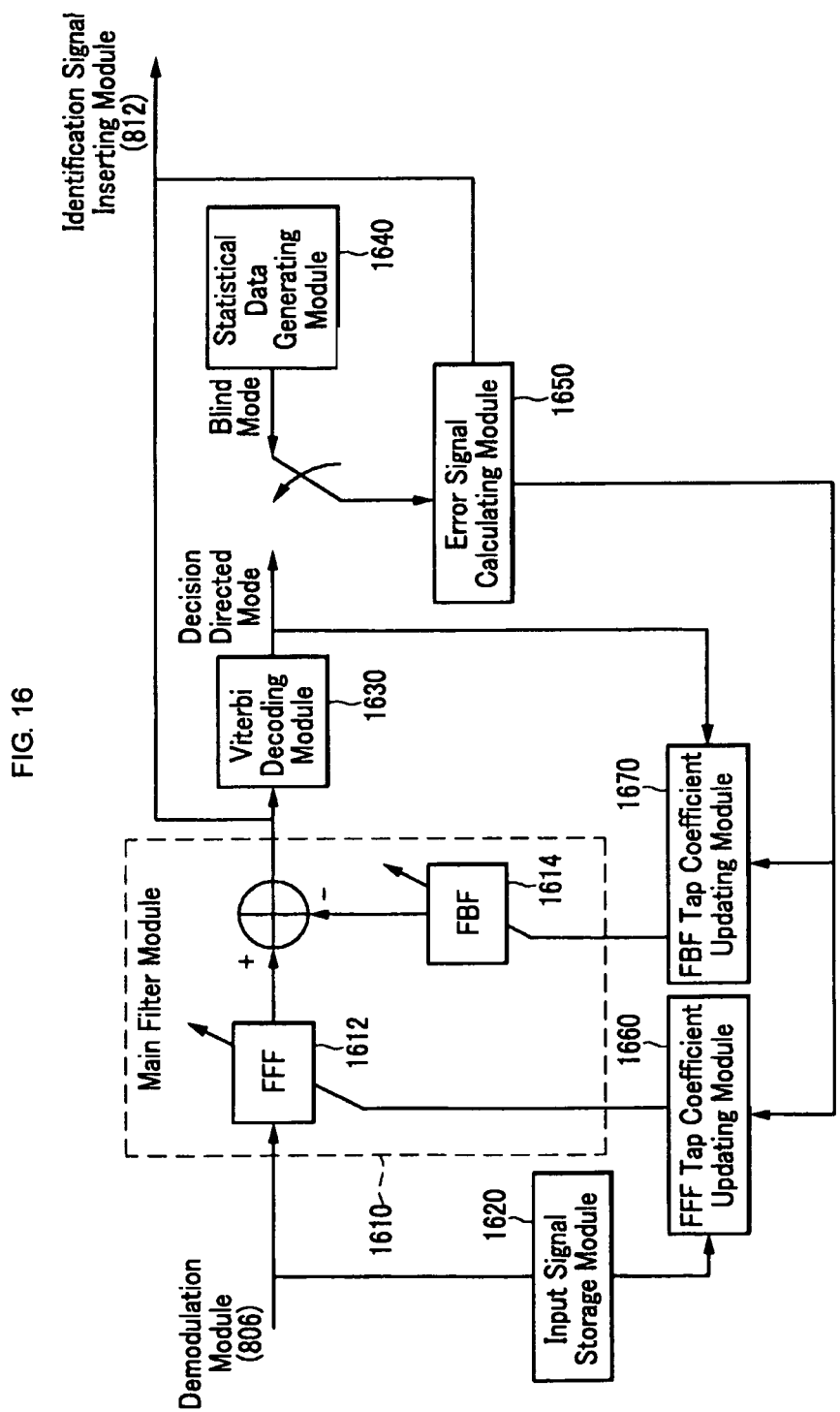
FIG. 16 is a diagram illustrating the structure of an equalizing module of the on-channel repeating apparatus according to the exemplary embodiment of the present invention.

FIG. 16 is a diagram illustrating the structure of the equalizing module of the on-channel repeating apparatus according to the exemplary embodiments of the present invention.

The equalizing module 808 or 1414 according to the exemplary embodiments of the present invention includes a main filter module 1610, an input signal storage module 1620, a Viterbi decoding module 1630, a statistical data generating module 1640, an error signal calculating module 1650, a feedforward filter (hereinafter referred to as FFF) tap coefficient updating module 1660, and a feedback filter (hereinafter referred to as FBF) tap coefficient updating module 1670.

The following description focuses on the equalizing module 808 that equalizes the converted baseband signal according to the first exemplary embodiment.

The main filter module 1610 repeatedly filters a baseband signal x[k] output from the demodulation module 806 to perform channel equalization, and outputs a baseband signal (y[k]). The main filter module 1610 includes an FFF module 1612, an FBF module 1614, and a tap coefficient subtracting module 1616.

The input signal storage module 1620 stores the baseband signal (x[k]) output from the demodulation module 806.

The Viterbi decoding module 1630 decodes the baseband signal (y[k]) output from the main filter module 1610 using a Viterbi decoding algorithm having a traceback depth of 1 to output symbol d̂[k]. In this case, the output symbol (d̂[k]) is used as a decision-directed mode output signal.

For example, a SOVA (soft output Viterbi algorithm) decoder or a slicer may be used as the Viterbi decoding module 1630.

The statistical data generating module 1640 stores statistical error data and provides it if necessary. The statistical data generating module 1640 outputs a statistical error symbol ẑ[k], and the output error symbol ( ) is used as a blind mode output signal.

The error signal calculating module 1650 selects the decision-directed mode output signal (d̂[k]) output from the Viterbi decoding module 1630 or the blind mode output signal (ẑ[k]) output from the statistical data generating module 1640 according to whether the current mode is the decision-directed mode or the blind mode, and compares the selected signal with the baseband signal (y[k]) output from the main filter module 1610 to calculate an error signal e[k]

The FFF tap coefficient updating module 1660 updates a tap coefficient $b_i[k]$ of the FFF 1612 using the error signal (e[k]) output from the error signal calculating module 1650 and the signal output from the input signal storage module 1620.

The FBF tap coefficient updating module 1670 updates a tap coefficient $a_i[k]$ of the FBF 1614 using the error signal (e[k]) output from the error signal calculating module 1650 and the decision directed mode output signal (d̂[k]) output from the Viterbi decoding module 1630.

The operation of the equalizing module 808 of the on-channel repeating apparatus is performed as follows.

The main filter module 1610 uses the tap coefficient subtracting module 1616 to perform channel equalization on the baseband signal (x[k]) output from the demodulation module 806, thereby calculating the difference (y[k]) between the tap coefficient ($b_i[k]$) of the FFF 1612 and the tap coefficient ($a_i[k]$) of the FBF 1614. In this case, the baseband signal (y[k]) is calculated by Equation 9 given below:

$$y[k] = \sum_{i=0}^{N_b-1} b_i[k]x[k-i] - \sum_{j=1}^{N_a} a_j[k]\hat{d}[k-j] \quad \text{(Equation 9)}$$

(where $N_b$ indicates a tap number of the FFF, $N_a$ indicates a tap number of the FBF, $a_j[k]$ indicates a tap coefficient of the FBF, $b_i[k]$ indicates a tap coefficient of the FFF, and d̂[k] indicates a decision directed mode signal output from the Viterbi decoding module).

The Viterbi decoding module 1630 receiving the baseband signal (y[k]) output from the main filter module 1610 outputs a symbol (d̂[k]) using a Viterbi decoding algorithm having a traceback depth of 1. The statistical data generating module 1640 outputs a blind mode output signal (ẑ[k]) as statistical error data.

In the error signal calculating module 1650, a switch is connected to the Viterbi decoding module 1630 or the statistical data generating module 1640 according to whether the current mode is the decision-directed mode or the blind mode. Then, the error signal calculating module 1650 compares the decision directed mode output signal (d̂[k]) or the blind mode output signal (ẑ[k]) with the baseband signal (y[k]) output from the main filter module 1610 to calculate the error signal (e[k]). The error signal (e[k]) is calculated by Equation 10 given below:

$$e[k] = \hat{d}[k] - y[k] \quad \text{(Equation 10)}$$

The FFF tap coefficient updating module 1660 updates the tap coefficient ($b_i[k]$) of the FFF 1612 on the basis of the error signal (e[k]) calculated by the error signal calculating module 1650 and the output signal from the input signal storage module 1620, and the FBF tap coefficient updating module 1670 updates the tap coefficient ($a_j[k]$) of the FBF 1614 on the basis of the decision-directed mode output signal (d̂[k]) output from the Viterbi decoding module 1630 and the error signal (e[k]) output from the error signal calculating module 1650.

The tap coefficients of the FFF 1612 and the FBF 1614 are updated by Equation 11 given below:

$$b_i[k+1] = b_i[k] + \mu e[k]x[k-i]$$

$$a_j[k+1] = a_j[k] - \mu e[k]\hat{d}[k-j] \quad \text{(Equation 11)}$$

(where $\mu$ indicates a step size, and determines a convergence speed and a mean square error (MSE) in a normal state).

That is, as the step size ($\mu$) increases, the convergence speed increases, but the mean square error in the normal state increases. On the other hand, when the step size ($\mu$) decreases, the mean square error decreases, but the convergence speed is lowered.

The equalization digital on-channel repeating method and apparatus with an improved capability of removing the feedback signal can be used for various single frequency networks, such as broadcasting systems including ATSC, DVB, DMB, and ISDB-T and communication systems including WiBro and CDMA.

The above-described exemplary embodiments of the present invention can be applied to programs that allow computers to execute functions corresponding to the configurations of the exemplary embodiments of the invention or recording media including the programs as well as the method and apparatus. Those skilled in the art can easily implement the applications from the above-described exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An on-channel repeating apparatus for repeating signals received from a main transmitter or another repeating apparatus through an on-channel, the apparatus comprising:
   an identification signal generating unit that generates identification signals;
   a feedback signal removing unit that generates a replica of a feedback signal on a basis of a signal received from the main transmitter or another repeating apparatus and an identification signal, and then removes the feedback signal using the generated replica, the feedback signal removing unit including a subtracting unit that subtracts the replica of the feedback signal from signals in a predetermined band that are converted by the receiving unit, and a replica generating unit that generates the replica of the feedback signal on the basis of the signal output from the receiving unit, the signal obtained by the subtracting unit and the identification signal generated by the identification signal generating unit, and feeds back the generated replica to the subtracting unit;
   a demodulation unit that demodulates the signal delivered from the feedback signal removing unit into a baseband signal;
   an identification signal inserting unit that inserts the identification signal generated by the identification signal generating unit into the baseband signal; and
   a transmitting unit that transmits the baseband signal having the identification signal inserted thereinto.

2. The on-channel repeating apparatus of claim 1, further comprising:
   a receiving unit that converts the signal received from the main transmitter or another repeating apparatus into signals in a predetermined band, and delivers the converted signals in the predetermined band to the feedback signal removing unit as the received signals; and
   an equalization unit that equalizes the signals demodulated by the demodulation unit to remove noise, a multipath signal, and the remaining feedback signal therefrom, and delivers the signals to the identification signal inserting unit.

3. The on-channel repeating apparatus of claim 2,
   wherein the replica generating unit includes:
   a channel estimating unit that generates a filter tap coefficient on the basis of the identification signal generated by the identification signal generating unit and the signal output from the receiving unit; and
   an adaptive filtering unit that filters the signal obtained by the subtracting unit using the filter tap coefficient to generate the replica of the feedback signal.

4. The on-channel repeating apparatus of claim 3,
   wherein the channel estimating unit includes:
   a first unit that demodulates the signal output from the receiving unit into a baseband signal; and
   a second unit that generates a filter tap coefficient vector on the basis of the baseband signal demodulated by the first unit and the identification signal generated by the identification signal generating unit.

5. The on-channel repeating apparatus of claim 3,
   wherein the channel estimating unit includes:
   a first unit that modulates the identification signal generated by the identification signal generating unit into a signal in the same band as that of the signal output from the receiving unit; and
   a second unit that generates a filter tap coefficient vector on the basis of the signal modulated by the first unit and the signal output from the receiving unit.

6. The on-channel repeating apparatus of claim 1, wherein the identification signal generating unit generates, as the identification signals with good correlation properties, signals whose auto-correlation values when synchronization is obtained are larger than their auto-correlation values when synchronization is not obtained and their cross-correlation values.

7. An on-channel repeating apparatus for repeating signals received from a main transmitter or another repeating apparatus through an on-channel, the apparatus comprising:
   an identification signal generating unit that generates identification signals;
   a demodulation unit that demodulates a signal received from the main transmitter or another repeating apparatus into a baseband signal;
   a feedback signal removing unit that generates a replica of a feedback signal on the basis of the baseband signal and the identification signal, and removes the feedback signal using the generated replica, the feedback signal removing unit including a subtracting unit that subtracts the replica of the feedback signal from the baseband signal demodulated by the demodulation unit; and a replica generating unit that generates the replica of the feedback signal on the basis of the baseband signal demodulated by the demodulation unit, the signal obtained by the subtracting unit signal output from the receiving unit, the signal obtained by the subtracting unit, and the identification signal generated by the identification signal generating unit, and feeds back the generated replica to the subtracting unit;
   an identification signal inserting unit that inserts the identification signal into the output signal without the feedback signal; and
   a transmitting unit that modulates the signal having the identification signal inserted thereinto and transmits the modulated signal.

8. The on-channel repeating apparatus of claim 7, further comprising:
   a receiving unit that converts the signal received from the main transmitter or another repeating apparatus into signals in a predetermined band, and delivers the converted signals in the predetermined band to the demodulation unit; and
   an equalization unit that equalizes the signals output from the feedback signal removing unit to remove noise, a multipath signal, and the remaining feedback signal therefrom, and delivers the signals to the identification signal inserting unit.

9. The on-channel repeating apparatus of claim 7,
   wherein the replica generating unit includes:
   a correlation unit that generates a filter tap coefficient on the basis of the baseband signal demodulated by the demodulation unit and the identification signal generated by the identification signal generating unit; and
   an adaptive filtering unit that uses the filter tap coefficient to filter the signal obtained by the subtracting unit, thereby generating the replica.

10. An on-channel repeating apparatus for repeating signals received from a main transmitter or another repeating apparatus through an on-channel, the apparatus comprising:

a receiving unit that converts RF signals received from the main transmitter or another repeating apparatus into baseband signals;

an identification signal generating unit that generates identification signals;

a feedback signal removing unit that generates a replica of a feedback signal on the basis of the baseband signals and the identification signal, and removes the feedback signal using the replica, the feedback signal removing unit including a subtracting unit that subtracts the replica of the feedback signal from the baseband signal, and a replica generating unit that generates a replica on the basis of the baseband signal delivered from the receiving unit, the signal obtained by the subtracting unit and the identification signal generated by the identification signal generating unit, and feeds back the generated replica to the subtracting unit;

a demodulation unit that performs frequency and timing synchronization on the signal delivered from the feedback signal removing unit to generate a carrier frequency offset;

an identification signal inserting unit that inserts the identification signal generated by the identification signal generating unit into the demodulated signal;

a transmitting unit that modulates the baseband signal having the identification signal inserted thereinto into an RF signal and delivers the RF signal; and a local oscillator that is provided between the receiving unit and the transmitting unit and supplies a reference frequency for conversion between the RF signal and the baseband signal.

11. The on-channel repeating apparatus of claim 10, further comprising:

an equalization unit that equalizes the signal synchronized by the demodulation unit to remove noise, a multipath signal, and the remaining feedback signal therefrom, and delivers the signal to the identification signal inserting unit.

12. The on-channel repeating apparatus of claim 10, wherein the replica generating unit includes:

a channel estimating unit that generates a filter tap coefficient on the basis of the identification signal generated by the identification signal generating unit and the baseband signal delivered from the received unit; and an adaptive filtering unit that uses the filter tap coefficient to filter the signal obtained by the subtracting unit, thereby generating the replica.

13. An on-channel repeating method of repeating signals received from a main transmitter or another repeating apparatus through an on-channel, the method comprising:

subtracting a replica of a feedback signal from a signal received from the main transmitter or another repeating apparatus;

converting the signal from which the replica of the feedback signal is subtracted into a baseband signal;

equalizing the baseband signal to remove noise, a multipath signal, and the remaining feedback signal from the signal;

generating identification signals, and inserting the generated identification signal into the equalized baseband signals;

modulating the baseband signals having the identification signal inserted thereinto and transmitting the modulated signals;

and after the transmitting of the modulated signals, generating the replica of the feedback signal on the basis of signals received from the main transmitter or another repeating apparatus, the signal from which the replica of the feedback signal is subtracted, and the identification signal, and using the generated replica to repeat the on-channel repeating method after the subtracting of the replica of the feedback signal.

14. The method of claim 13, wherein the generating of the replica of the feedback signal and the repeating of the processes includes:

generating a filter tap coefficient on the basis of the identification signals generated by the identification signal generating unit and the signal received from the main transmitter or another repeating apparatus;

using the filter tap coefficient to filter the signal from which the replica of the feedback signal is subtracted, thereby generating the replica of the feedback signal; and using the generated replica to repeat the processes after the subtracting of the replica of the feedback signal.

15. The method of claim 14, wherein the generating of the filter tap coefficient includes:

converting the signal received from the main transmitter or another repeating apparatus into baseband signals; and calculating a filter tap coefficient vector on the basis of the baseband signals and the identification signal generated by the identification signal generating unit.

16. The method of claim 14, wherein the generating of the filter tap coefficient includes:

modulating the identification signal generated by the identification signal generating units into signals in the same band as that of the signal received from the main transmitter or another repeating apparatus; and calculating the filter tap coefficient vector on the basis of the modulated signals and the signal received from the main transmitter or another repeating apparatus.

* * * * *